United States Patent
Plaquin et al.

(10) Patent No.: US 8,984,291 B2
(45) Date of Patent: Mar. 17, 2015

(54) ACCESS TO A COMPUTING ENVIRONMENT BY COMPUTING DEVICES

(75) Inventors: David Plaquin, Bristol (GB); Marco Ricca, Geneva (CH); Boris Balacheff, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 2259 days.

(21) Appl. No.: 11/389,336

(22) Filed: Mar. 23, 2006

(65) Prior Publication Data
US 2006/0265598 A1    Nov. 23, 2006

(30) Foreign Application Priority Data

Mar. 31, 2005    (GB) .................................. 0506456.3

(51) Int. Cl.
*G06K 9/00* (2006.01)
*H04L 29/06* (2006.01)

(52) U.S. Cl.
CPC ........ *H04L 63/0853* (2013.01); *H04L 63/0892* (2013.01)
USPC .............................................. 713/182; 726/7

(58) Field of Classification Search
USPC ......... 713/153, 163, 183, 193, 340, 164, 150; 714/38, 49, 48, 35, 37; 709/203, 217, 709/223, 237, 225, 229, 227, 211, 216, 709/219; 726/22, 14, 13, 11, 34, 25, 26, 27, 726/5; 380/42, 55, 58, 46; 707/E17.128, 707/E17.129, E17.118
See application file for complete search history.

(56) References Cited

U.S. PATENT DOCUMENTS

| | | | |
|---|---|---|---|
| 6,654,891 B1 | 11/2003 | Borsato et al. | |
| 7,315,885 B2* | 1/2008 | Weisshaar et al. | 709/217 |
| 7,430,663 B2* | 9/2008 | Brown et al. | 713/156 |
| 2003/0018786 A1 | 1/2003 | Lortz | |
| 2004/0167984 A1* | 8/2004 | Herrmann | 709/229 |
| 2005/0089027 A1* | 4/2005 | Colton | 370/380 |
| 2005/0198534 A1* | 9/2005 | Matta et al. | 713/201 |
| 2005/0216736 A1* | 9/2005 | Smith | 713/168 |
| 2005/0288056 A1* | 12/2005 | Bajikar et al. | 455/554.2 |
| 2008/0256605 A1* | 10/2008 | Malinen | 726/4 |
| 2008/0288762 A1* | 11/2008 | Chen et al. | 713/2 |

FOREIGN PATENT DOCUMENTS

| EP | 1414216 A2 | 4/2004 |
|---|---|---|
| WO | WO03046748 A1 | 6/2003 |

* cited by examiner

*Primary Examiner* — Jeffrey Pwu
*Assistant Examiner* — Nega Woldemariam
(74) *Attorney, Agent, or Firm* — Hewlett-Packard Patent Department (57) ABSTRACT

A method for managing access to a computing environment by a computing device includes providing at least one credential that identifies both the computing device and a user of the computing device, storing data at the computing environment relating to the computing device and the user in association with the credential, and selectively granting an access request received from the computing device using the credential in accordance with the data stored at the computing environment.

12 Claims, 4 Drawing Sheets

ACCESS TO A COMPUTING ENVIRONMENT BY COMPUTING DEVICES

RELATED APPLICATIONS

This application for letters patent is related to and claims the benefit of an earlier filing date and right of priority of foreign filed patent application GB0506456.3, filed in the United Kingdom on Mar. 31, 2005, which is also hereby incorporated by reference.

BACKGROUND

Our work and home lives increasingly revolve around computer systems. Computer systems are commonly joined together to form networks in the workplace and an increasing number of homes also have some form of computer network (even though in many cases the home owner does not know it) and this trend is set continue with the introduction of intelligent appliances, networked home entertainment systems and the like. However, it is well known from traditional computer networks in the workplace that unless the introduction of computer systems onto a network is extremely well controlled, the security of the resulting computer network is adversely affected.

Given the level of reliance placed on computer systems and computer networks and the sensitivity of data stored, security is an ever increasing concern. Computer systems and the data stored on them are increasingly becoming the most important assets of a business or person.

Various mechanisms and technologies have been developed to address these concerns and protect such assets. However, current mechanisms are either directed to protection at the computer system (such as password protection, biometric access systems, encryption of data etc.) or to centralised authentication within a managed network.

One framework for intelligently controlling access to computer based resources, enforcing policies, auditing usage, and providing information necessary to bill for services is called Authentication, Authorization, and Accounting (AAA). These combined processes are considered important in many enterprises for effective system management and security. The framework is typically implemented using a dedicated AAA server that acts as the gateway to network resources.

Authentication provides a way of identifying a user, typically by having the user enter a valid user name and valid password before access is granted. The process of authentication is based on each user having a unique set of credentials for gaining access. The AAA server compares a user's authentication credentials with other user credentials stored in a database. If the credentials match, the user is granted access to the network, otherwise network access is denied.

Following authentication, a user may gain authorization for doing certain tasks. After logging into a system, for instance, the user may try to issue commands. The authorization process determines whether the user has the authority to issue such commands. Authorization normally occurs within the context of authentication. Once you have authenticated a user, they may be authorized for different types of access or activity.

Accounting measures the resources a user consumes during access. This can include the amount of system time or the amount of data a user has sent and/or received during a session. Accounting is carried out by logging of session statistics and usage information and is used for authorization control, billing, trend analysis, resource utilization, and capacity planning activities.

Combinations of such measures may be employed depending on the needs of an individual or business. However, whilst a combination of measures may increase the security protecting the assets, management and maintenance of the measures also increases.

In an enterprise, current solutions for asset management rely on good behaviour from users. For instance, it is assumed that a user would not disclose their access credentials to another individual. It is also assumed that administrator privileges will not be easily obtainable and will only be granted to highly trusted individuals and/or the consequences of granting such privileges would be minimal in the protection of the asset.

These assumptions are regularly proven to be incorrect, especially where users have physical access to resources and the resources may be located and/or moved to remote locations where management staff cannot monitor them and the policies and restrictions of the AAA server do not locally apply. This is particularly the case where an enterprise has a mobile workforce. Whilst it is extremely convenient to have a laptop that can store data and possibly remotely access data stored centrally by the enterprise, the user is normally trusted to: ensure the security of the physical asset (eg. not leaving the laptop on view in a car or losing it); ensure the wellbeing of the physical asset (eg. updating antivirus software, not disabling or circumventing security functionality such as firewalls); and, ensure the security of the data (password protecting or encrypting data stored on the laptop itself and not revealing access details for remote access to the enterprise).

Very few organisations or enterprises achieve such levels of security with their assets, especially where a mobile workforce is involved and their primary role is not IT specific.

BRIEF DESCRIPTION OF THE DRAWINGS

Embodiments of the present invention will now be described in detail, by way of example only, with reference to the accompanying drawings, in which.

DETAILED DESCRIPTION

An exemplary method for managing access to a computing environment by a computing device includes the following steps. At least one credential is provided at the computing device. The credential identifies both the computing device and a user of the computing device. Data is stored at the computing environment relating to the computing device and the user in association with the credential. The computing environment grants or denies access requests received from the computing device using the credential in accordance with the data stored at the computing environment in association with the at least one credential.

This method can be realised particularly effectively if the computing device is "trusted"—in that it can be trusted in interaction to behave in a reliable and predictable way—particularly if such trust is provided by use of "trusted computing". "Trusted computing" is described further below.

A recent development in IT security is the provision of data processing systems (referred to as a "platform") that are "trusted"—that is, can be relied on by the user to behave in a predictable manner and that subversion by another will at least be apparent. Trusted computing system specifications have been developed by the Trusted Computing Platform Alliance and the Trusted Computing Group, among others. By way of example, in the Trusted Computing Group specification and in the associated book "Trusted Computing Platforms: TCPA Technology in Context", edited by Siani Pearson and published July 2002 by Prentice Hall PTR, there is described an approach to trusted computing which employs a trusted coprocessor (both physically and logically protected from subversion) to assure a user of data processing system including or associated with the trusted coprocessor that it is performing in a predictable and un-subverted manner. In addition or alternatively, a compartmentalised operating system may be used (e.g., by operating in a compartmentalised manner such that processes run in separated computing environments that have strictly controlled interaction with other computing environments).

A trusted platform typically includes one or more trusted platform components (trusted platform components are described here as Trusted Platform Modules or TPMs) that may be a logical (software) or a physical (hardware) component within the platform. Whilst the trustworthiness of a TPM may be measured relative to a standard such as that of the Trusted Computing Group, it will typically be the manufacturer of the TPM vouching (and often providing a digital certificate certifying) for the trustworthiness of its module that imparts the trust.

Credentials may be implemented in the form of certificates to be stored within a secure component such as a trusted platform module (TPM) of the respective computing device. Asset management policies can be used to force regular updates, maintenance, managing access rights for lost or decommissioned computing devices and the like. Asset management policies may be implemented by manipulating/updating data stored at the enterprise that is associated with the credentials in dependence on the respective policy requirements. As authentication of access requests is made with reference to the data, assets not conforming to the policies may be blocked from authentication. Credentials may be accessible only once a user has authenticated locally at the TPM (or equivalent). This makes two factor authentication possible with local authentication of the user followed by remote authentication of the asset credentials at the enterprise.

Figure 1:
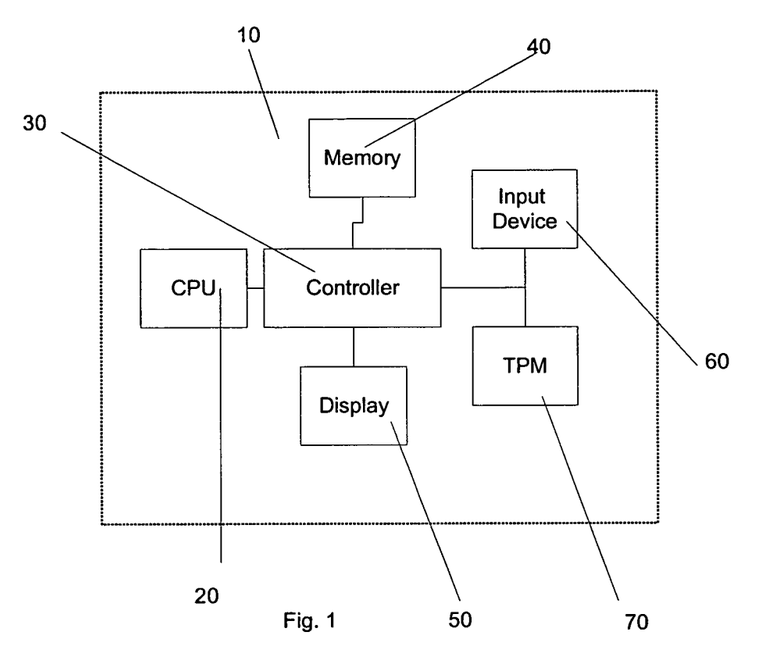
FIG. 1 is a schematic diagram of an exemplary data processing system suitable for implementation of certain embodiments of the present invention in the form of a computer platform.

FIG. 1 is a schematic diagram of an example data processing system in the form of a computer platform including a TPM.

In this example, computer platform 10 is a trusted platform that includes a central processing unit (CPU) 20, a controller 30, a memory 40, a display 50, an input device 60 and a TPM 70. The CPU 20 is connected to the controller 30, which is in turn connected to the memory 40, display 50 and TPM 70.

Many configurations of the computer platform are possible and will depend on the purpose of the computer platform and personal preferences of the designer of the platform and/or the end user. For example, the controller 30 may be a motherboard, a collection of controllers (each connected via a bus to their respective devices or components and to each other), or some other component. The memory 40 may include a Random Access Memory, a hard disk, some other form of data storage device or any combination of these. Similarly, the input device 60 may include a keyboard, mouse, smart card reader, RFID tag reader, magnetic stripe card reader or any other input device. Selected components of the computer platform, such as the input device 60 and/or the display 50 may be omitted. Other components such as network interface devices, modems and the like may be included in the computer platform as needed.

As discussed above, the trusted platform module (TPM) 70 may be a physical component such as a video controller, storage device controller, network adapter, processor or the like or a logical component such as a software application, routine or environment.

By use of a TPM in a computing platform, there is enabled a level of trust between different computing platforms. It is possible to query such a trusted platform about its state, and to compare it to a trusted state, either remotely, or through a monitor on the computer entity.

The presence of the TPM makes it possible for a third party, either remote or local to the computing platform to communicate with the computing platform in order to identify it as authentic.

Figure 2:
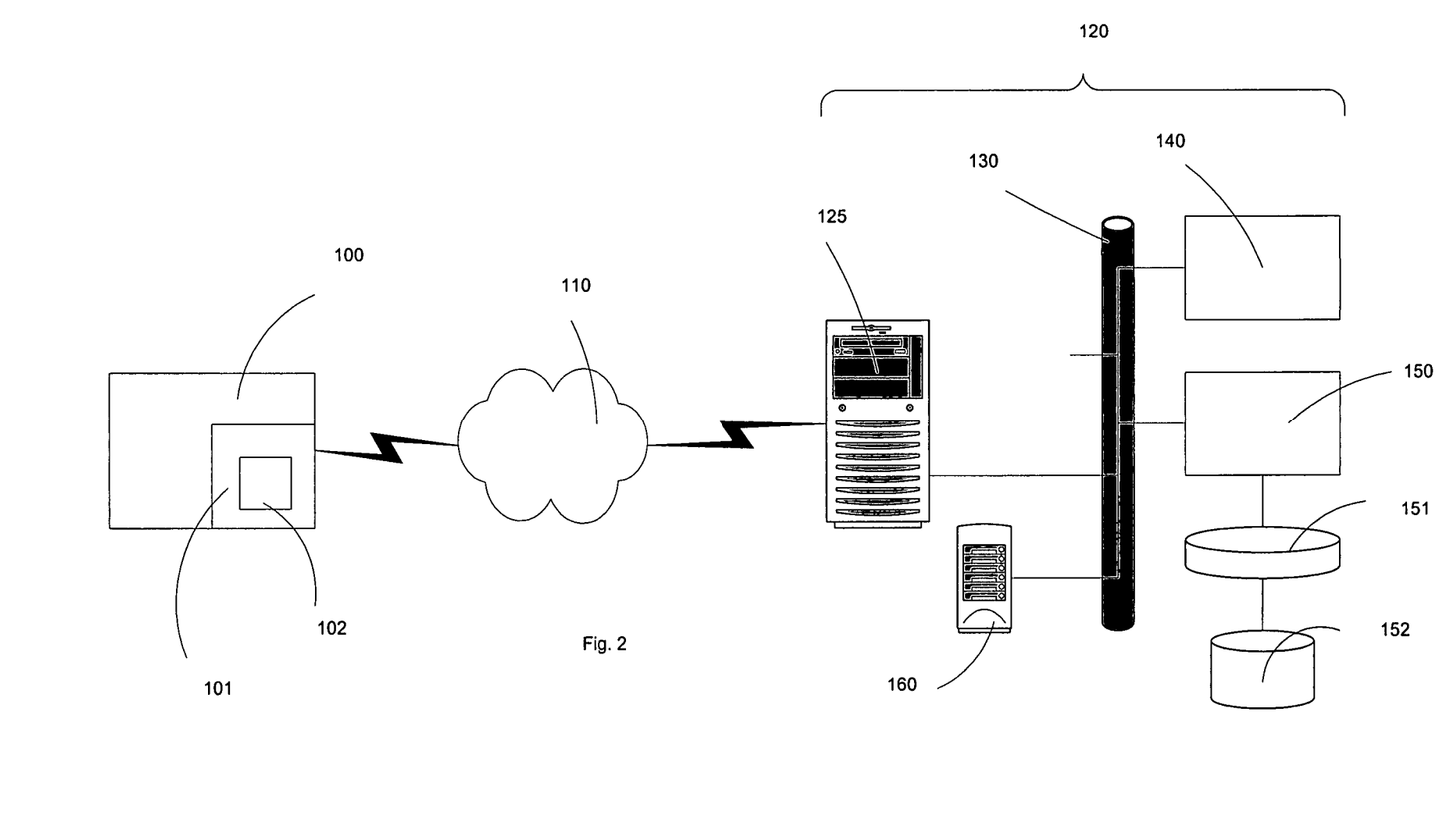
FIG. 2 is a schematic diagram illustrating operation of an asset management system according to an embodiment of the present invention.

FIG. 2 is a schematic diagram illustrating operation of an asset management system according to an embodiment of the present invention.

A computing device, in the form of a client computer system 100, is to be introduced into an enterprise 120 so that it can subsequently be used in accordance with asset management policies set by the enterprise 120 and access enterprise resources (assuming the accessing user has sufficient privileges).

The enterprise 120 includes an access gateway 125 connected to a network 130. The enterprise also includes an AAA server 140 and an enterprise directory maintained by a Lightweight Directory Access Protocol (LDAP) server 150. Access to enterprise resources is managed by the AAA server 140.

The LDAP server 150 maintains a hierarchical directory of users and devices in a database 151. Enterprise users and/or systems are able to query the directory to determine, for example, where in the network something is located, contact information associated with something, or in the case of authentication the password of a user. An asset database 152 is connected to the LDAP directory database linking an entry in the LDAP directory database for an asset to a corresponding entry in the asset database 152. The asset database 152 may be a separate database or part of the LDAP directory database.

During deployment of the computing device 100, credentials 102 for a user are set within a trusted component 101. In this embodiment, the credentials 102 include a certificate and the trusted component 101 is a TPM although many other trusted components and credentials could be used.

In order to set the credentials 102 for a user of the computing device 100, a certificate is generated or otherwise provided by the enterprise 120 that includes data on the computing device 100. The certificate is then stored in the TPM and one or more user passwords or other access control systems such as a biometric access system are also set up to protect the credentials 102 from access by non-authorised users. Data on the computing device 100 is also added to the LDAP directory database 151. An entry for the computing device 100 is added to the asset database 152 and this entry is linked to the data on the asset in the LDAP directory database 151. Computing devices 100 would normally be put through this process during provisioning/deployment, although it could be performed at any time.

It can be seen that the credentials 102 relate to the combination of a computing device 100 and a user. The user passwords or other access controls protect access to the credentials 102 so that only a user that has authenticated locally with the trusted component 120 can access his or her respective credentials. Once accessed, the credentials allow a user to access the network 130 via a network 110 and the access gateway 125 and authenticate with the AAA server 140.

Upon receipt of credentials 102, the AAA server 140 cross-references with the LDAP server 150 for authentication. For example, authentication may include:

1) verification that the computing device 100 presenting the credentials 102 corresponds to the computing device 100 originally assigned the credentials 102 during provisioning;

2) determination of whether the certificate is active; and, 3) identification of the resources the user/asset combination defined by the credentials 102 is authorised to access.

Once authenticated, a user using the asset is able to access whatever resources are identified in step 3 of the authentication process. If step 1 or 2 fails then the computing device 100 would be denied access based on the presented credentials 102.

For example, if a user, who had the certificate 102 assigned to the computing device 100, wanted to access a file stored on RAID system 160 via the client computer (computing device) 100, she accesses the certificate 102 held within the TPM 101 by locally providing her user password to the TPM 101. The TPM 101 authenticates the user locally and, assuming authentication is successful, the user is permitted to access her certificate 102. Using the certificate, the user is able to use the client computer 100 to connect to the access gateway 125 via the network 110. At the access gateway 125, data from the certificate 102 (or the certificate itself) is transmitted to the AAA server 140. The AAA server 140 cross-references the certificate with data stored by the LDAP server 150 as discussed above. The client computer 100 is authenticated on behalf of the user and assuming the AAA server 140 grants sufficient access privileges, the user can then access files on the RAID system 160 via the network 130.

It will be appreciated that as the certificate (credentials) 102 is tied to the respective user and respective computing device 100, another user would not be able to use those credentials on that computing device 100, nor would the user be able to access the enterprise 120 using another computing device 100 without credentials for the user on that computing device 100 also.

Figure 3:
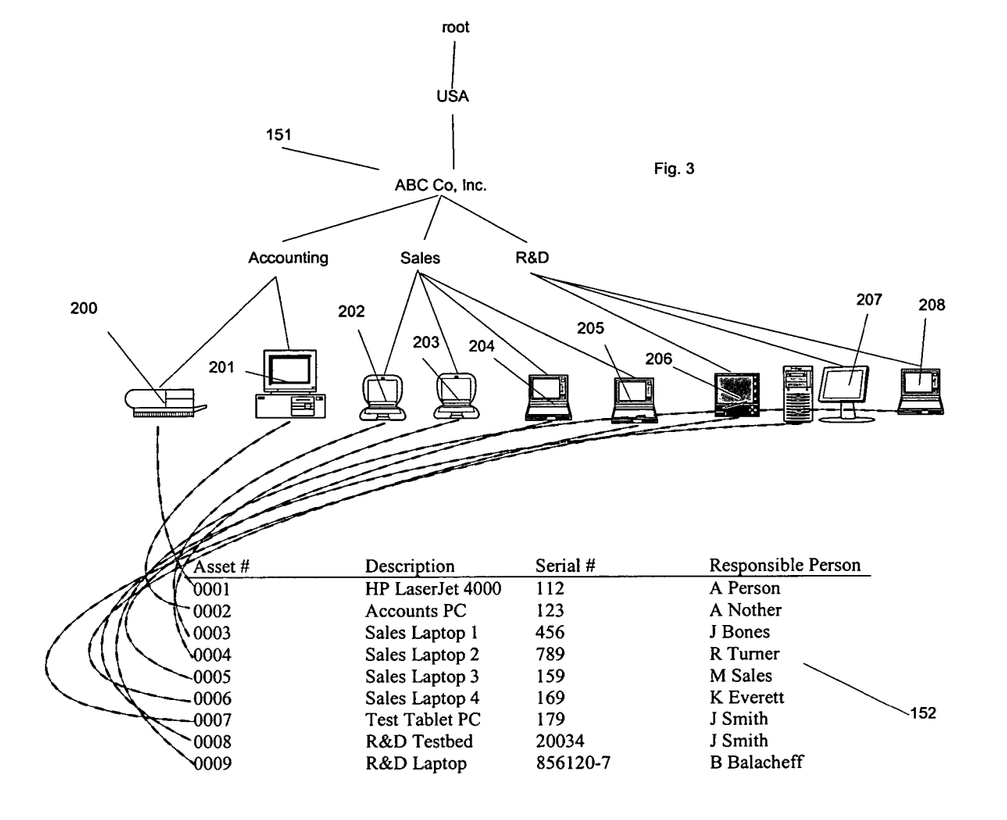
FIG. 3 is a schematic diagram illustrating excerpts from a sample LDAP and asset database for use in an asset management system according to an embodiment of the present invention; and, FIG. 4 is a flow diagram illustrating selected steps of an asset management method according to an embodiment of the present invention.

FIG. 3 is a schematic diagram illustrating excerpts from a sample LDAP and asset database.

Only entries corresponding to assets have been shown in the LDAP 151, although it will be appreciated that there may be entries for users and possibly resources such as files also.

Each entry 200-208 corresponds to a computing device within the enterprise. Each entry is located within its respective organisation and department. During the provisioning process discussed above with respect to FIG. 2, each asset may be assigned a unique asset number or identifier. The asset number links the LDAP entry to a corresponding entry in the asset database 152 (as is shown by dotted lines). In this embodiment, the asset database 152 includes a description field, a serial number field and a field for data on the person responsible for the computing device.

During step 2 of the authentication process discussed above, the entry for the asset database 152 may be checked to ensure it exists and is not flagged as inactive.

If, for example, sales laptop 203 is stolen, its entry can be removed or otherwise flagged as inactive in the asset database 152. Should a certificate be successfully accessed from the TPM of the laptop 203, authentication may be refused because a corresponding active entry in the asset database 152 would not be found. In contrast to certificates where the certificate are placed on a black list in such a circumstance which may take time to propagate, control is retained by the enterprise, access rights via the asset can quickly and easily be rescinded and no revocation of the certificate at the laptop 203 is needed.

More generally, maintaining the asset database may include the step of flagging the stored data as inactive in the event of one of a number of predetermined conditions associated with the computing device. The predetermined conditions may include: reported loss or theft of the computing device; decommissioning of the computing device; expiry of a predetermined time period with respect to the computing device since at least one of: presentation for inspection; last maintenance; update of anti-virus software; update of system software; update of the credentials and, synchronisation of stored data.

Figure 4:
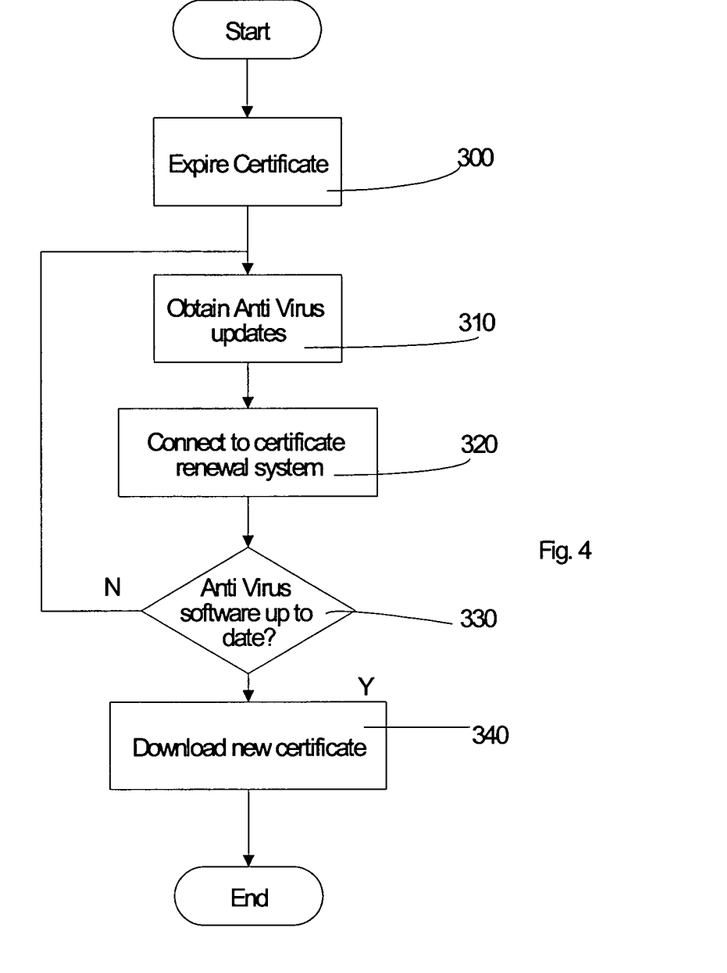

FIG. 4 is a flow diagram illustrating selected steps of an asset management method according to an embodiment of the present invention.

Asset management policies including updating, auditing and/or maintenance policies can be enforced on computing devices by expiring access rights associated with a certificate after a certain amount of time and only permitting renewal of the rights once the asset management policy requirements have been performed. For example, assuming the sales department illustrated with reference to FIG. 3 operates remotely, it would be desirable to ensure that antivirus updates are performed at least weekly. The certificate held by the TPM in the respective computing devices 202-205 can be set to expire after a predetermined period, as is shown in step 300.

When the user next attempts to connect to the enterprise 120 using the certificate, they may be advised that it has expired and instructed to renew the certificate. Expiry could be by actually expiring the certificate, and/or by flagging or marking the certificate as inactive at the asset database 152.

Assuming the user is diligent enough to do so, in step 310, anti virus updates are obtained for the computing device. If not then this step is skipped at this time.

To re-activate or otherwise renew the certificate, the computing device is connected to a certificate renewal system in step 320, which may be satisfied in step 330 that the anti virus software is substantially up to date. If the certificate renewal system is satisfied then the certificate would be re-activated or a new certificate can be downloaded into the TPM of the computing device in step 340, otherwise renewal of the certificate for the computing device is rejected.

The certificate renewal system may be local to the enterprise 120 (and accessible via the AAA server) or it may be a remote system, for example a World Wide Web server. In order to provide the certificate renewal system with security and prevent unauthorised systems obtaining certificates, the certificate held by the computing device in the TPM may be used for authentication purposes. Even though the certificate could be expired for purposes of accessing general resources such as RAID system 160 of the enterprise 120, it may have a longer (or indefinite) lifetime assigned for the purposes of authentication with the certificate renewal system.

In one alternative, the certificate held by the TPM may not expire, instead the asset management system may expire the access rights within the AAA server and/or the LDAP database associated with the certificate until such time as maintenance/update/audit requirements can be met.

In another alternative, a two tier (or more) certificate model could be used within an enterprise. A basic certificate could be obtainable over an insecure communications channel such as the internet whilst a premium certificate could be issued in a more secure environment such as direct from a helpdesk. In this manner, access rights can be restricted so that normal work can be performed by those accessing the enterprise network remotely but if access to sensitive information is desired then a premium certificate may be obtained (and renewed as necessary) while the asset is present and can be evaluated by support staff. This could be used to ensure that computer bases assets used to access more sensitive information would be returned to the helpdesk (for secure keeping and/or regular updating or maintenance).

In some circumstances, more than one certificate could be provided per user per computing device, different certificates providing different privileges and having different renewal mechanisms/criteria.

In addition to tasks such as updating, asset management policies can be implemented using expiring rights or certificates to encourage remote users to provide timesheets, sales reports or the like.

If a certificate of a computing device is not renewed then the computing device could still be operable but access to the enterprise would be prevented.

It will be appreciated that more than one certificate could be associated with a computing device. This would allow different users to use the computing device, potentially with different access rights.

Although authentication of the user at the TPM of a computing device has only been described with reference to passwords it will be appreciated that other authentication mechanisms such as biometric identification, smart cards and the like could be used.

Although the above description has focussed on the use of computing devices including TPMs within computer platforms that would normally be described as Personal Computers (PCs) or servers, TPMs and equivalent systems can be used within any computing platform including Personal Digital Assistants (PDAs), cellular telephones, embedded computing platforms such as those used in point of sale terminals, cashpoints, control systems and set-top boxes, all of which could be considered computing devices for the purposes of the present invention.

What is claimed is:

1. A method for managing access of a computing device to a plurality of assets of a computing environment, the method comprising:
   providing at least one credential at the computing device, the at least one credential identifying both the computing device and a user of the computing device;
   storing data at the computing environment relating to the computing device and the user in association with the at least one credential, the data indicating which of the assets the computing device is permitted to access when the at least one credential is authenticated;
   the computing device communicating the at least one credential to the computing environment;
      the computing environment selectively granting an access request received from the computing device in accordance with the data stored at the computing environment in association with the at least one credential and in accordance with a status the computing environment determined for the at least one credential communicated by the computing device;
      flagging the data at the computing environment and associated with the at least one credential as being inactive in response to a reported loss, theft, or decommissioning of the computing device identified by the at least one credential; and
   the computing environment denying the access request in the event that the computing environment determines that the computing device identified with the at least one credential associated is inactive.

2. A method as claimed in claim 1, wherein the computing environment comprises a processor adapted to implement an asset management policy for the computing device, and wherein the data relating to the computing device and the user comprises data relating to management of the computing device in accordance with the asset management policy.

3. A method as claimed in claim 1, wherein the computing device comprises a trusted component at least logically protected from a main processing environment of the computing device, and wherein the trusted component holds the at least one credential.

4. A method as claimed in claim 1, wherein the computing device is adapted to use the at least one credential to make the access request only when the user has been authenticated by the computing device.

5. A method as claimed in claim 3, wherein the computing device is adapted to use the at least one credential to make the access request only when the user has been authenticated by the computing device and wherein the trusted component is adapted to authenticate the user.

6. A method as claimed in claim 2, further comprising:
   flagging data associated with the at least one credential as inactive in the event of at least one predetermined condition associated with the computing device, whereupon the access request received from the computing device using the at least one credential is not granted.

7. A method as claimed in claim 1, wherein the computing environment determines that the computing device identified with the at least one credential is inactive in the event of at least one predetermined condition selected from a group consisting of:
   a reported the reported loss or theft of the computing device;
   a decommissioning the decommissioning of the computing device; and
   an expiry of a predetermined time period since the computing device was last presented for inspection or maintenance.

8. The method of claim 1, further comprising flagging the data at the computing environment and associated with the at least one credential as being inactive in response to expiry of a predetermined time period since an update of anti-virus software or system software in the computing device identified by the at least one credential.

9. The method of claim 1, further comprising flagging the data at the computing environment and associated with the at least one credential as being inactive in response to expiry of a predetermined time period since synchronization of stored data in the computing device identified by the at least one credential.

10. A method for managing access of a computing device to a plurality of assets of a computing environment, the method comprising:
   storing at least one credential in a trusted component of the computing device, the at least one credential identifying both the computing device and a user of the computing device;

storing data at the computing environment relating to the computing device and the user in association with the at least one credential, the data indicating which of the assets the computing device is permitted to access when the at least one credential is authenticated;

the computing device communicating the at least one credential from the trusted component to the computing environment; and the computing environment selectively granting access requests from the computing device in accordance with the data stored at the computing environment in association with the at least one credential and in accordance with a status of the computing environment determined for the at least one credential communicated by the computing device.

11. The method of claim 10, wherein selectively granting access requests comprises applying an asset management policy to select which of the assets of the computing environment the user identified by the at least one credential can access when using the computing device identified by the at least one credential.

12. The method of claim 10, further comprising the computing environment denying the access requests in the event that the computing environment determines that the computing device identified with the at least one credential is inactive.

* * * * *

UNITED STATES PATENT AND TRADEMARK OFFICE
CERTIFICATE OF CORRECTION

PATENT NO. : 8,984,291 B2  
APPLICATION NO. : 11/389336  
DATED : March 17, 2015  
INVENTOR(S) : David Plaquin et al.

Page 1 of 1

It is certified that error appears in the above-identified patent and that said Letters Patent is hereby corrected as shown below:

In the Specification,

In column 3, line 52, delete "asset credentials" and insert -- asset/credentials --, therefor.

In the Claims,

In column 8, line 42, in Claim 7, delete "a reported the reported" and insert -- a reported --, therefor.

In column 8, line 44, in Claim 7, delete "a decommissioning the decommissioning" and insert -- a decommissioning --, therefor.

Signed and Sealed this  
Tenth Day of November, 2015

Michelle K. Lee  
*Director of the United States Patent and Trademark Office*